(12) United States Patent
Fard et al.

(10) Patent No.: US 11,871,798 B2
(45) Date of Patent: Jan. 16, 2024

(54) ELECTRONIC SMOKING SUBSTITUTE DEVICE AND MOBILE DEVICE WITH FEEDBACK APPLICATION

(71) Applicant: Imperial Tobacco Limited

(72) Inventors: Daniel Fard, Liverpool (GB); Oliver Talbot, Liverpool (GB)

(73) Assignee: Imperial Tobacco Limited, Bristol (GB)

( * ) Notice: Subject to any disclaimer, the term of this patent is extended or adjusted under 35 U.S.C. 154(b) by 0 days.

(21) Appl. No.: 18/056,553

(22) Filed: Nov. 17, 2022

(65) Prior Publication Data
US 2023/0078703 A1 Mar. 16, 2023

Related U.S. Application Data

(63) Continuation of application No. 17/002,054, filed on Aug. 25, 2020, now Pat. No. 11,528,944, which is a
(Continued)

(30) Foreign Application Priority Data

Feb. 26, 2018 (GB) ...................... 1803028

(51) Int. Cl.
*A24F 40/65* (2020.01)
*A24F 40/53* (2020.01)
(Continued)

(52) U.S. Cl.
CPC .............. *A24F 40/65* (2020.01); *A24F 40/53* (2020.01); *A24F 40/60* (2020.01);
(Continued)

(58) Field of Classification Search
CPC .......... A24F 40/65; A24F 40/53; A24F 40/60; A24F 40/10; H04M 1/72412; H04M 2250/56
See application file for complete search history.

(56) References Cited

U.S. PATENT DOCUMENTS 9,317,916 B1 * 4/2016 Hanina .................. G16H 20/10
11,106,773 B2 * 8/2021 Popplewell ............. A24F 40/53
(Continued)

FOREIGN PATENT DOCUMENTS

WO 2014195805 A2 12/2014

OTHER PUBLICATIONS

International Search Report, dated Jun. 19, 2019, in PCT/EP2019/053505, filed Feb. 13, 2019.
(Continued)

*Primary Examiner* — Yuwen Pan
*Assistant Examiner* — Angelica M Perez
(74) *Attorney, Agent, or Firm* — DUNLAP CODDING, P.C.

(57) ABSTRACT

A mobile device is described. The mobile device includes an application installed thereon. The application is configured to communicate with a smoking substitute device, wherein the application is configured to: instruct a user to perform an operation at the smoking substitute device; verify whether the operation has been correctly performed by the user at the smoking substitute device; and inform the user whether the operation has been correctly performed.

7 Claims, 5 Drawing Sheets

Related U.S. Application Data continuation of application No. PCT/EP2019/053505, filed on Feb. 13, 2019.

(51) Int. Cl.
*A24F 40/60* (2020.01)
*H04M 1/72412* (2021.01)
*A24F 40/10* (2020.01)

(52) U.S. Cl.
CPC ......... *H04M 1/72412* (2021.01); *A24F 40/10* (2020.01); *H04M 2250/56* (2013.01)

(56) References Cited

U.S. PATENT DOCUMENTS

| | | |
|---|---|---|
| 2015/0101625 A1 | 4/2015 | Newton et al. |
| 2015/0181945 A1* | 7/2015 | Tremblay ................ A24F 40/60 131/328 |
| 2015/0339953 A1* | 11/2015 | Shah ...................... G09B 23/28 434/262 |
| 2016/0081393 A1* | 3/2016 | Black ..................... H04L 67/10 392/404 |
| 2016/0082208 A1* | 3/2016 | Ballam ............. A61M 16/0003 128/200.14 |
| 2016/0144141 A1* | 5/2016 | Biswas ............... A61M 15/009 128/200.23 |
| 2016/0293054 A1* | 10/2016 | Milton-Edwards .... G09B 5/125 |
| 2016/0354562 A1* | 12/2016 | Morrison .......... A61M 15/0001 |
| 2017/0013883 A1* | 1/2017 | Han ........................ A24F 40/51 |
| 2018/0043114 A1* | 2/2018 | Bowen ................ A61M 15/003 |
| 2018/0116291 A1* | 5/2018 | Monsees ................. A24F 40/42 |

OTHER PUBLICATIONS

Written Opinion of the International Searching Authority, dated Jun. 19, 2019, in PCT/EP2019/053505, filed Feb. 13, 2019.

* cited by examiner

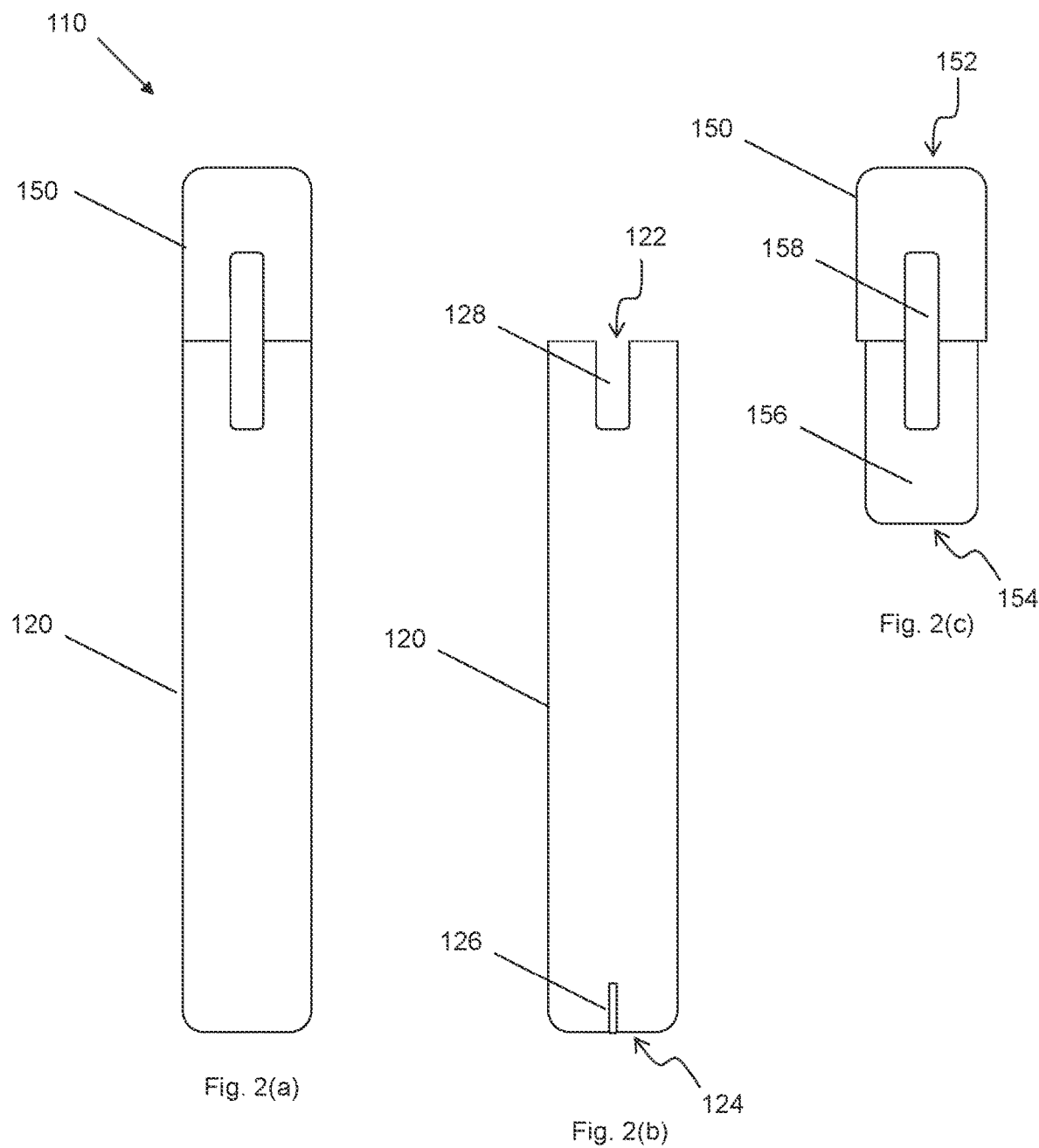

ELECTRONIC SMOKING SUBSTITUTE DEVICE AND MOBILE DEVICE WITH FEEDBACK APPLICATION

CROSS-REFERENCE TO RELATED APPLICATIONS/INCORPORATION BY REFERENCE STATEMENT

The present patent application is a continuation of U.S. Ser. No. 17/002,054, filed Aug. 25, 2020 which is a continuation of International Application No. PCT/EP2019/053505, filed Feb. 13, 2019; which claims priority to the patent application identified by GB Serial No. 1803028.8, filed on Feb. 26, 2018. The entire contents of each of the above-referenced patent(s)/patent application(s) are hereby expressly incorporated by reference herein.

TECHNICAL FIELD

The present disclosure relates to mobile devices, systems, methods and computer readable media associated with a smoking substitute devices.

BACKGROUND

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol, also referred to as a "vapour", that is drawn into the lungs through the mouth (inhaled) and then exhaled. The inhaled aerosol typically bears nicotine and/or flavourings without, or with fewer of, the odour and health risks associated with traditional smoking.

In general, smoking substitute devices are intended to provide a substitute for the rituals of smoking, whilst providing the user with a similar experience and satisfaction to those experienced with traditional smoking and tobacco products.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilising a different smoking substitute approach. A smoking substitute approach corresponds to the manner in which the substitute system operates for a user.

One approach for a smoking substitute device is the so-called "vaping" approach, in which a vapourisable liquid, typically referred to (and referred to herein) as "e-liquid", is heated by a heating device to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapour") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the myblu™ e-cigarette. The myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapour which is inhaled by a user through the mouthpiece.

Another example vaping smoking substitute device is the blu PRO™ e-cigarette. The blu PRO™ e-cigarette is an open system device which includes a main body, a (refillable) tank, and a mouthpiece. The main body and tank are physically and electrically coupled together by screwing one to the other. The mouthpiece and refillable tank are physically coupled together by screwing one of the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapour which is inhaled by a user through the mouthpiece.

Another approach for a smoking substitute device is the so-called "heat not burn" ("HNB") approach in which tobacco (rather than e-liquid) is heated or warmed to release vapour. The tobacco may be leaf tobacco or reconstituted tobacco. The vapour may contain nicotine and/or flavourings. In the HNB approach the intention is that the tobacco is heated but not burned, i.e. does not undergo combustion.

A typical HNB smoking substitute device may include a main body and a consumable. The consumable may include the tobacco material. The main body and consumable may be configured to be physically coupled together. In use, heat may be imparted to the tobacco material by a heating device that is typically located in the main body, wherein airflow through the tobacco material causes moisture in the tobacco material to be released as vapour. A vapour may be formed from a carrier in the tobacco material (this carrier may for example include propylene glycol and/or vegetable glycerin) and additionally volatile compounds released from the tobacco. The released vapour may be entrained in the airflow drawn through the tobacco.

As the vapour passes through the smoking substitute device (entrained in the airflow) from an inlet to a mouthpiece (outlet), the vapour cools and condenses to form an aerosol (also referred to as a vapour) for inhalation by the user. The aerosol will normally contain the volatile compounds.

In HNB smoking substitute devices, heating as opposed to burning the tobacco material is believed to cause fewer, or smaller quantities, of the more harmful compounds ordinarily produced during smoking. Consequently, the HNB approach may reduce the odour and/or health risks that can arise through the burning, combustion and pyrolytic degradation of tobacco.

An example of the HNB approach is the IQOS™ smoking substitute device from Philip Morris Ltd. The IQOS™ smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapour and flavourings which may be drawn through the mouthpiece by the user through inhalation.

A second example of the HNB approach is the device known as "Glo"™ from British American Tobacco p.l.c. Glo™ comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapour and flavourings which may be drawn through the consumable by the user through inhalation. The tobacco, when heated by the heating device, is configured to produce vapour when heated rather than when burned (as in a smoking apparatus, e.g. a cigarette). The tobacco may contain high levels of aerosol formers (carrier), such as vegetable glycerine ("VG") or propylene glycol ("PG").

The present inventor(s) have observed that most smoking substitute devices currently on the market are configured to operate in isolation of other devices, which limits the functions the smoking substitute devices can perform.

The present inventor(s) have also observed that as smoking substitute devices become more sophisticated, it becomes more challenging to inform a user about the functions the smoking substitute device can perform. Some users ignore or do not want to read instruction manuals explaining such functions.

The present disclosure has been devised in light of the above considerations.

BRIEF DESCRIPTION OF THE DRAWINGS

Embodiments and experiments illustrating the principles of the present disclosure will now be discussed with reference to the accompanying figures in which:

FIG. 2(a) shows an example smoking substitute device for use as the smoking substitute device in the system of FIG. 1.

FIG. 2(b) shows the main body of the smoking substitute device of FIG. 2(a) without the consumable.

FIG. 2(c) shows the consumable of the smoking substitute device of FIG. 2(a) without the main body.

DETAILED DESCRIPTION

Figure 1:
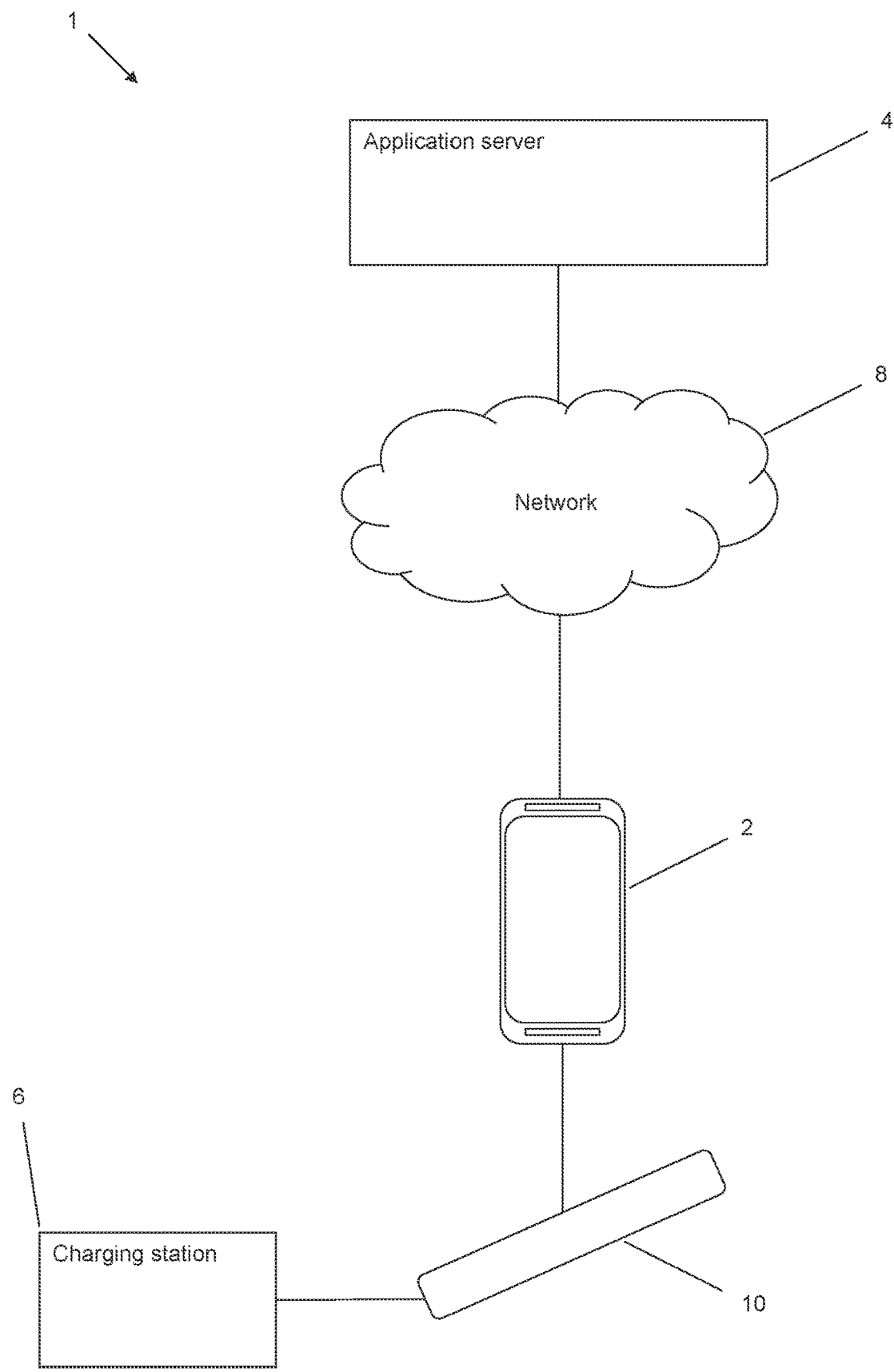
FIG. 1 shows an example system for managing a smoking substitute device.

According to a first non-limiting aspect of the present disclosure, there is provided a mobile device on which an application is installed, the application being configured to communicate with a smoking substitute device, wherein the application is configured to: inform a user about a function that can be performed by the smoking substitute device; and instruct the smoking substitute device to demonstrate the function.

Accordingly, the user of the smoking substitute device may be taught about a function, or functions, of the smoking substitute device without the need for instructions, such as a product manual. Therefore, functions of the smoking substitute device are easier to understand and users may respond to functions more quickly and easily. As the application is configured to instruct the smoking substitute device to demonstrate a function, the user can experience a demonstration of the function (which could be performance of the function or a simulation of the function), thereby further helping the user to more easily recognise the function of the smoking substitute device.

The mobile device may be a mobile phone or a tablet, for example.

The function may be the smoking substitute device providing feedback to a user that indicates a state of the smoking substitute device.

Such feedback could be any one or more of, but not limited to: operating a light, operating a light in a predetermined colour, operating a flashing light in a predetermined sequence and/or a predetermined colour, haptic feedback (e.g. vibration of the smoking substitute device), producing a sound. Accordingly, the smoking substitute device may include any one or more of, but not limited to: a light, such as an LED, and/or a speaker for producing a sound, and/or an actuator for producing haptic feedback.

A state of the smoking substitute device indicated by the feedback could be any one or more of, but not limited to: (i) the smoking substitute device is charging; (ii) a power source of the smoking substitute device has low battery; (iii) a power source of the smoking substitute device has full battery; (iv) the smoking substitute device is searching for a connection (e.g. a wireless connection) to the application on the mobile device; (v) the smoking substitute device is connected to the application on the mobile device; (vi) the smoking substitute device is not connected to the application on the mobile device; (vii) the smoking substitute device is activated; (viii) the smoking substitute device is not activated; (ix) a consumable is not correctly connected to a main body of the smoking substitute device; (x) a consumable is correctly connected to a main body of the smoking substitute device; (xi) a consumable is empty; (xii) a consumable is full.

Note that demonstrating a function does not necessarily require the function to be performed. For example, demonstrating a function could involve the application instructing the smoking substitute device to simulate the function by providing feedback indicating a particular state in order to demonstrate the function, without the device necessarily being in that state.

In this way, the user can experience a demonstration of the feedback that indicates a state of the smoking substitute device, without the smoking substitute device actually being in that state. Therefore, the user is taught to determine a state of the substitute smoking device based on corresponding feedback. In this way, whenever the smoking substitute device performs the function (i.e. performs the feedback), the user can establish that the function indicates a specific state of the smoking substitute device, and therefore determine that the smoking substitute device is in that specific state, e.g. without the user needing to read a paper-based instruction manual.

As an example, the application may inform a user that a flashing red light on the smoking substitute device indicates low battery, and then instruct the smoking substitute device to demonstrate the flashing red light. The user is made aware of how the flashing red light appears on the smoking substitute device, and that the flashing red light is indicative of low battery. Therefore, whenever the light on the smoking substitute device flashes red, the user can determine that the smoking substitute device has a low battery. The user may then decide to charge the smoking substitute device accordingly.

The application may be configured to instruct the smoking device to demonstrate the function wirelessly via a wireless interface on the mobile device and a wireless interface on the smoking substitute device. In other words, the application may be configured to wirelessly communicate with a smoking substitute device to instruct the smoking substitute device to demonstrate the function via a wireless communication channel between a wireless interface on the mobile device and a wireless interface on the smoking substitute device. For example, the smoking substitute device may be configured to communicate via Bluetooth™, or via WiFi, with the application. Alternatively, the application may be configured to instruct the smoking device to demonstrate the function via a cable connection.

The application may be configured to communicate with an application server, e.g. via a network. The network may be a wireless communication channel such as a cellular network, a Bluetooth™ network or a WiFi network. The application server may be configured to communicate information about the function to the application. The information about the function may be stored in the application server, e.g. which may itself utilise cloud storage. Further, the application may be configured to instruct the smoking substitute device to demonstrate the function based on the information communicated from the application server. In other words, information received by the application from the application server may be used by the application to perform the above steps in relation to the function. An advantage of this arrangement is that if the smoking substitute device gains a new function, e.g. due to firmware pushed out to the smoking substitute device by the application server, then that new function can be demonstrated to the user based on information received from the application server, without the need to find another way of informing the user about the new functionality. The information received by the application from the application server could be configured to cause the application to automatically inform and demonstrate a new function acquired by the smoking substitute device (e.g. in a manner described herein), when the smoking substitute device gains that function.

The application may be further configured to inform the user that the function is being demonstrated. In this way, the user is made aware that a demonstration of the function is taking place. Alternatively, the application may be configured to inform the user that the function will be demonstrated, or that the function has been previously demonstrated.

The application may be further configured to inform a user about a second function that can be performed by the smoking substitute device; and instruct the smoking substitute device to demonstrate the second function. It should be noted that any number of functions could be performed and/or demonstrated by the smoking substitute device. In this way, the user is able to distinguish between different functions, and therefore different states of the smoking substitute device. Specifically, the user is able to distinguish between different feedbacks to establish a state of the smoking substitute device.

As an example, the application may inform a user that a flashing red light on the smoking substitute device indicates low battery, and then instruct the smoking substitute device to demonstrate the flashing red light. The application may then inform the user that a flashing blue light on the smoking substitute device indicates that a consumable is empty, and then instruct the smoking substitute device to demonstrate the flashing blue light. The user is made aware of how the flashing red light appears on the smoking substitute device, and that the flashing red light is indicative of low battery. The user is also made aware of how the flashing blue light appears on the smoking substitute device, and that the flashing blue light is indicative that a consumable is empty. Therefore, whenever the light on the smoking substitute device flashes red, the user can determine that the smoking substitute device has a low battery. Similarly, whenever the light on the smoking substitute device flashes blue, the user can determine that the smoking substitute device has an empty consumable. In other words, in use, the user is able to distinguish between the flashing red light and the flashing blue light, and determine the state of the smoking substitute device. The user may then charge the smoking substitute device, or replace/refill a consumable, accordingly.

A second non-limiting aspect of the present disclosure relates to a system for managing a smoking substitute device including a mobile device according to the first non-limiting aspect of the present disclosure.

According to a second non-limiting aspect of the present disclosure, there is provided a system for managing a smoking substitute device including: a mobile device according to the first non-limiting aspect of the present disclosure; and a smoking substitute device, wherein the smoking substitute device is configured to communicate with the application.

In certain non-limiting embodiments, the smoking substitute device is configured to communicate wirelessly with the application, e.g. via a wireless interface on the mobile device and a wireless interface on the smoking substitute device.

In certain non-limiting embodiments, the smoking substitute device is configured to demonstrate the function when instructed to do so by the application, e.g. as described above, thereby helping the user to more easily recognise the function of the smoking substitute device.

A third non-limiting aspect of the present disclosure relates to a method performed by a mobile device according to the first non-limiting aspect of the present disclosure or a system according to the second non-limiting aspect of the present disclosure.

According to a third non-limiting aspect of the present disclosure, there is provided a method including, at a mobile device on which an application is installed, wherein the application is configured to communicate with a smoking substitute device, performing the steps of: informing a user about a function that can be performed by the smoking substitute device; and instructing the smoking substitute device to demonstrate the function.

Accordingly, the user of the smoking substitute device may be taught about functions of the smoking substitute device without the need for instructions, such as a product manual. Therefore, functions of the smoking substitute device are easier to understand and users may respond to functions more quickly and easily.

The method may further include, at the smoking substitute device, demonstrating the function. Accordingly, the user can experience a demonstration, or simulation, of the function, thereby helping the user to more easily recognise the function of the smoking substitute device.

A method according to the third non-limiting aspect of the present disclosure may include a method step or feature corresponding to any feature or step described in connection with the first and/or second non-limiting aspects of the present disclosure.

According to a fourth non-limiting aspect of the present disclosure, there is provided a computer-readable medium having computer-executable instructions configured to cause a mobile device or system to perform a method according to the third non-limiting aspect of the present disclosure.

According to a fifth non-limiting aspect of the present disclosure, there is provided a mobile device on which an application is installed, the application being configured to communicate with a smoking substitute device, wherein the application is configured to: instruct a user to perform an operation at the smoking substitute device; verify whether the operation has been correctly performed by the user at the smoking substitute device; inform the user whether the operation has been correctly performed.

The operation may be inserting a consumable into a main body of the smoking substitute device. After the user has indicated at the application that the user has performed the operation, the application may communicate with the smoking substitute device to instruct the smoking substitute device to check (i.e. verify) whether the operation has been correctly performed at the smoking substitute device.

In some examples, the smoking substitute device may inform the user whether the operation has been correctly performed by the smoking substitute device providing feedback such as one or more of: operating a light, operating a light in a predetermined colour, operating a flashing light in a predetermined sequence and/or a predetermined colour, haptic feedback (e.g. vibration of the smoking substitute device), producing a sound.

In some examples, the smoking substitute device may communicate information to the application indicating whether the operation has been performed correctly. The application may then inform the user whether the operation has been correctly (or incorrectly) performed based on the information received from the smoking substitute device, e.g. through displaying a notification on a screen of the mobile device.

In this way, a user can learn how to operate the smoking substitute device correctly, without necessarily needing to read a paper-based instruction manual.

A sixth non-limiting aspect of the present disclosure relates to a system for managing a smoking substitute device including a mobile device according to the fifth non-limiting aspect of the present disclosure.

According to a sixth non-limiting aspect of the present disclosure, there is provided a system for managing a smoking substitute device including: a mobile device according to the fifth non-limiting aspect of the present disclosure; and a smoking substitute device, wherein the smoking substitute device is configured to communicate with the application (such as (but not limited to) wirelessly communicate with the application).

A seventh non-limiting aspect of the present disclosure relates to a method performed by a mobile device according to the fifth non-limiting aspect of the present disclosure or a system according to the sixth non-limiting aspect of the present disclosure.

According to a seventh non-limiting aspect of the present disclosure, there is provided a method including, at a mobile device on which an application is installed, wherein the application is configured to communicate with a smoking substitute device, performing the steps of: instructing a user to perform an operation at the smoking substitute device; verifying whether the operation has been correctly performed by the user at the smoking substitute device; and informing the user whether the operation has been correctly performed.

A method according to the seventh non-limiting aspect of the present disclosure may include a method step or feature corresponding to any feature or step described in connection with the fifth and/or sixth non-limiting aspects of the present disclosure.

According to an eighth non-limiting aspect of the present disclosure, there is provided a computer-readable medium having computer-executable instructions configured to cause a mobile device or system to perform a method according to the seventh non-limiting aspect of the present disclosure.

The present disclosure includes the combination of the aspects and particular features described except where such a combination is clearly impermissible or expressly avoided.

Aspects and embodiments of the present disclosure will now be discussed with reference to the accompanying figures. Further aspects and embodiments will be apparent to those skilled in the art. All documents mentioned in this text are incorporated herein by reference.

FIG. 1 shows an example system 1 for managing a smoking substitute device 10.

The system 1 as shown in FIG. 1 includes a mobile device 2, an application server 4, an optional charging station 6, as well as the smoking substitute device 10.

The smoking substitute device 10 is configured to communicate wirelessly, e.g. via Bluetooth™, with an application (or "app") installed on the mobile device 2, e.g. via a suitable wireless interface (not shown) on the mobile device 2. The wireless connection between the smoking substitute device 10 and the mobile device may be occasional, or intermittent. The mobile device 2 may be a mobile phone, for example. The application on the mobile phone is configured to communicate with the application server 4, via a network 8. The application server 4 may utilise cloud storage, for example.

The network 8 may include a cellular network and/or the internet.

A skilled person would readily appreciate that the mobile device 2 may be configured to communicate via the network 8 according to various communication channels, such as (but not limited to) a wireless communication channel such as via a cellular network (e.g. according to a standard protocol, such as 3G or 4G) or via a WiFi network.

The app installed on the mobile device and the application server 4 may be configured to assist a user with their smoking substitute device 10, based on information communicated between the smoking substitute device 10 and the app and/or information communicated between the app and the application server 4.

The charging station 6 (if present) may be configured to charge (and optionally communicate with) the smoking substitute device 10, via a charging port on the smoking substitute device 10. The charging port on the smoking substitute device 10 may be a USB port, for example, which may allow the smoking substitute device to be charged by any USB-compatible device capable of delivering power to the smoking substitute device 10 via a suitable USB cable (in this case the USB-compatible device would be acting as the charging station 6). Alternatively, the charging station could be a docking station specifically configured to dock with the smoking substitute device 10 and charge the smoking substitute device 10 via the charging port on the smoking substitute device 10.

FIG. 2(*a*) shows an example smoking substitute device 110 for use as the smoking substitute device 10 in the system 1 of FIG. 1.

In this example, the smoking substitute device 110 includes a main body 120 and a consumable 150. The consumable 150 may alternatively be referred to as a "pod."

In this example, the smoking substitute device 110 is a closed system vaping device, wherein the consumable 150 includes a sealed tank 156 and is intended for one-use only.

FIG. 2(*a*) shows the smoking substitute device 110 with the main body 120 physically coupled to the consumable 150.

FIG. 2(*b*) shows the main body 120 of the smoking substitute device 110 without the consumable 150.

FIG. 2(*c*) shows the consumable 150 of the smoking substitute device 110 without the main body 120.

The main body 120 and the consumable 150 are configured to be physically coupled together, in this example by pushing the consumable 150 into an aperture in a top end 122 of the main body 120. In other examples, the main body 120 and the consumable could be physically coupled together by screwing one onto the other, or through a bayonet fitting, for example. An optional light 126, e.g. an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 2) so that air can be drawn into the smoking substitute device 110 when a user inhales through the mouthpiece. At a bottom end 154 of the consumable 150, there is located a tank 156 that contains e-liquid. The tank 156 may be a translucent body, for example.

In certain non-limiting embodiments, the tank 156 includes a window 158, so that the amount of e-liquid in the tank 156 can be visually assessed. The main body 120 includes a slot 128 so that the window 158 of the consumable 150 can be seen whilst the rest of the tank 156 is obscured from view when the consumable 150 is inserted into the aperture in the top end 122 of the main body 120.

The tank 156 may be referred to as a "clearomizer" if it includes a window 158, or a "cartomizer" if it does not.

Figure 3A:
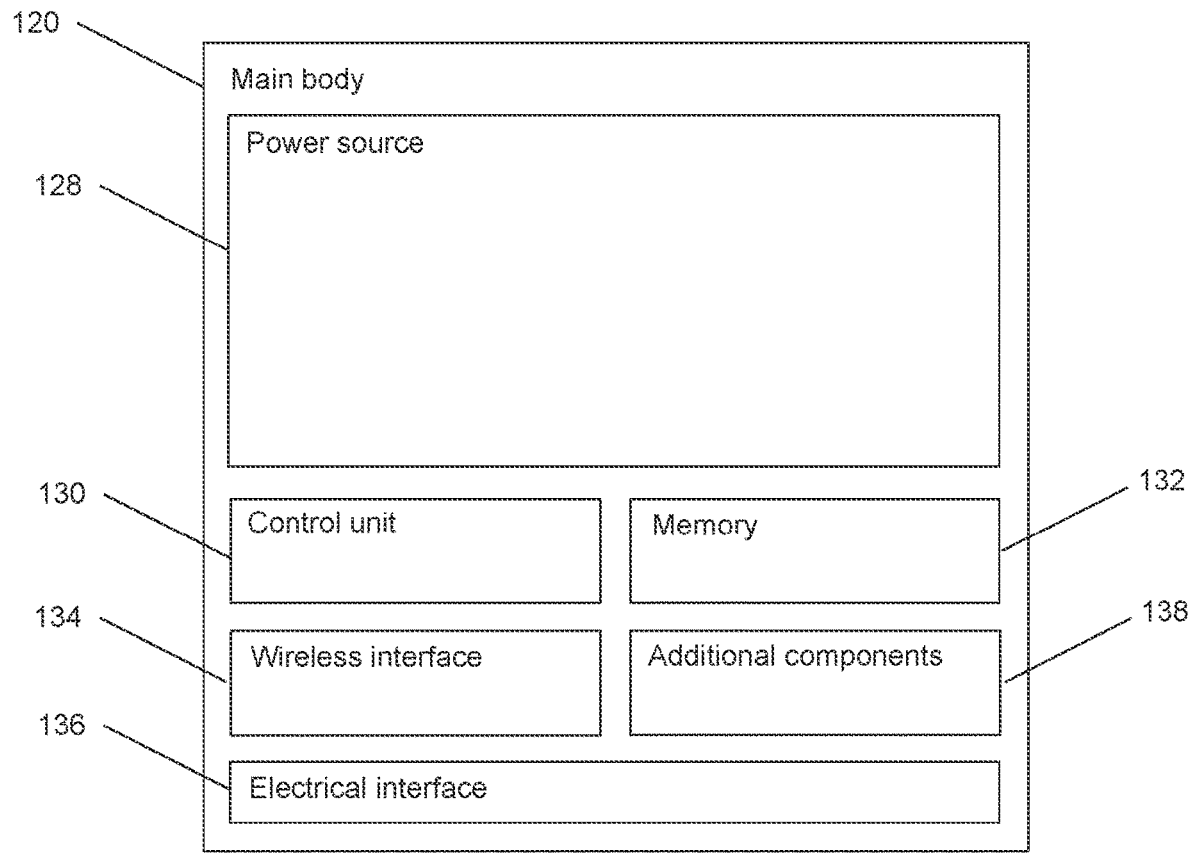
FIG. 3(a) is a schematic view of the main body of the smoking substitute device of FIG. 2(a).

FIG. 3(*a*) is a schematic view of the main body 120 of the smoking substitute device 110.

FIG. 3(*b*) is a schematic view of the consumable 150 of the smoking substitute device 110.

As shown in FIG. 3(*a*), the main body 120 includes a power source 128, a control unit 130, a memory 132, a wireless interface 134, an electrical interface 136, and, optionally, one or more additional components 138.

In certain non-limiting embodiments, the power source 128 is a battery, such as (but not limited to) a rechargeable battery.

The control unit 130 may include a microprocessor, for example.

In certain non-limiting embodiments, the memory 132 is includes non-volatile memory.

In certain non-limiting embodiments, the wireless interface 134 is configured to communicate wirelessly with the mobile device 2, e.g. via Bluetooth. To this end, the wireless interface 134 could include a Bluetooth™ antenna. Other wireless communication interfaces, e.g. WiFi, are also possible.

The electrical interface 136 of the main body 120 may include one or more electrical contacts. The electrical interface 136 may be located in, and in certain non-limiting embodiments at the bottom of, the aperture in the top end 122 of the main body 120. When the main body 120 is physically coupled to the consumable 150, the electrical interface 136 may be configured to pass electrical power from the power source 128 to (e.g. a heating device of) the consumable 150 when the smoking substitute device 110 is activated, e.g. via the electrical interface 160 of the consumable 150 (discussed below). When the main body 120 is not physically coupled to the consumable 150, the electrical interface may be configured to receive power from the charging station 6.

The additional components 138 of the main body 120 may include the optional light 126 discussed above.

The additional components 138 of the main body 120 may, if the power source 128 is a rechargeable battery, include a charging port configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 128 is a rechargeable battery, include a battery charging control circuit, for controlling the charging of the rechargeable battery. However, a battery charging control circuit could equally be located in the charging station 6 (if present).

The additional components 138 of the main body 120 may include an airflow sensor for detecting airflow in the smoking substitute device 110, e.g. caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less desired where the consumable 150 is intended to be disposed of after use, as in this example).

The additional components 138 of the main body 120 may include an actuator, e.g. a button. The smoking substitute device 110 may be configured to be activated when the actuator is actuated. This provides an alternative to the airflow sensor noted, as a mechanism for activating the smoking substitute device 110.

Figure 3B:
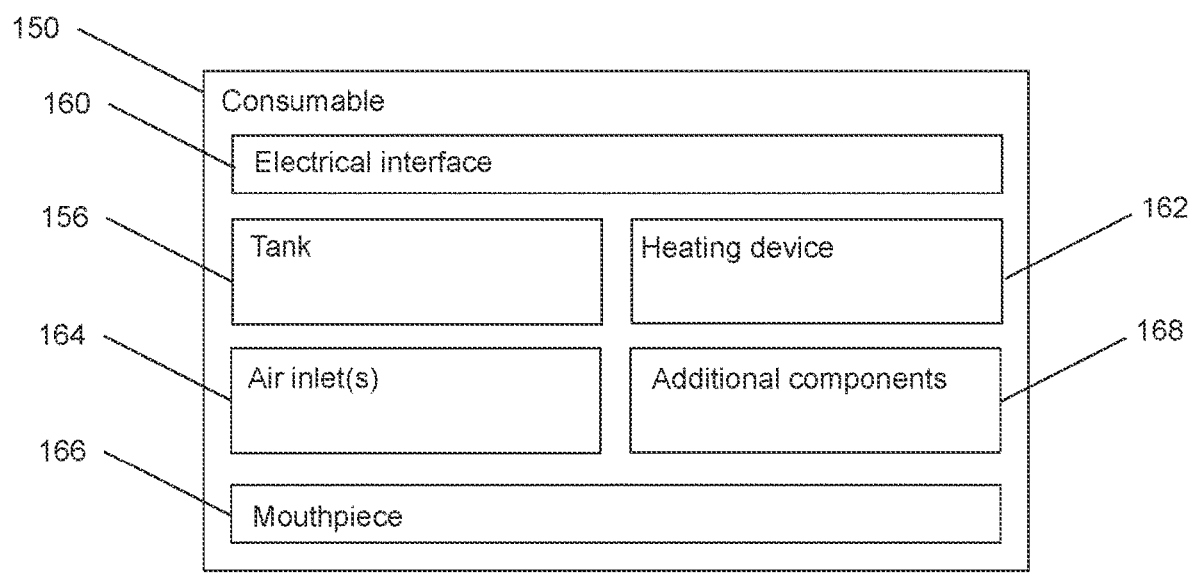
FIG. 3(b) is a schematic view of the consumable of the smoking substitute device of FIG. 2(a).

As shown in FIG. 3(b), the consumable 150 includes the tank 156, an electrical interface 160, a heating device 162, one or more air inlets 164, a mouthpiece 166, and, optionally, one or more additional components 168.

The electrical interface 160 of the consumable 150 may include one or more electrical contacts. In certain non-limiting embodiments, the electrical interface 136 of the main body 120 and an electrical interface 160 of the consumable 150 are configured to contact each other and therefore electrically couple the main body 120 to the consumable 150 when the main body 120 is physically coupled to the consumable 150. In this way, electrical energy (e.g. in the form of an electrical current) is able to be supplied from the power source 128 in the main body 120 to the heating device 162 in the consumable 150.

In certain non-limiting embodiments, the heating device 162 is configured to heat e-liquid contained in the tank 156, e.g. using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapour.

In certain non-limiting embodiments, the one or more air inlets 164 are configured to allow air to be drawn into the smoking substitute device 110, when a user inhales through the mouthpiece 166.

In use, a user activates the smoking substitute device 110, e.g. through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapour which is inhaled by a user through the mouthpiece 166.

Figure 4:
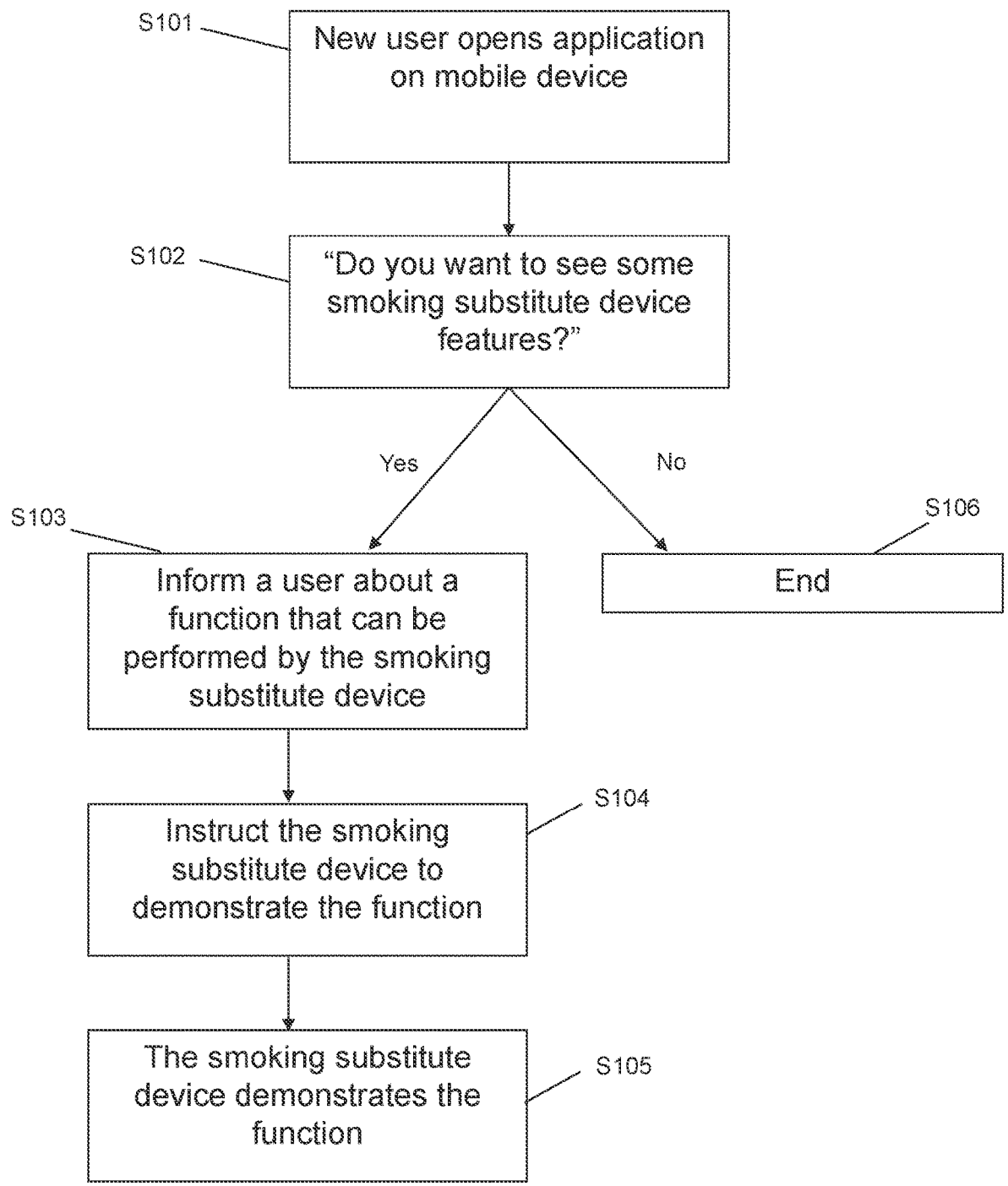
FIG. 4 is a block diagram showing an example method involving the smoking substitute device of FIG. 2(a).

FIG. 4 shows an example method involving the smoking substitute device 110 of FIG. 2(a).

As previously described, the application installed on the mobile device 2 is configured to communicate wirelessly with the smoking substitute device 110.

As shown in FIG. 4, a user opens the application on the mobile device 2 at S101, and the application asks the user whether they would like a function, or a plurality of functions, to be demonstrated at S102. As an example, the application may ask the user "Do you want to see some device features?".

The user may be a new user, i.e. a user who has not previously used the application, or a user who has not previously experienced a demonstration of the function(s).

If the user inputs to the application that they would not like any functions to be demonstrated (i.e. the user answer "No"), the smoking substitute device 110 will not demonstrate any functions and the process will end at S106.

If the user inputs to the application that they would like a function, or a plurality of functions, to be demonstrated (i.e. the user answers "Yes"), the application informs the user about a function that can be performed by the smoking substitute device 110 (i.e. at S103). The function may be the smoking substitute device 110 providing feedback to a user that indicates a state of the smoking substitute device 110.

As an example, the application may inform the user that a flashing red light on the smoking substitute device 110 indicates low battery. The flashing red light may be performed by light 126 shown in FIG. 2(b). Alternatively, the flashing red light may be at another light source.

The application may inform the user about a second function that can be performed by the smoking substitute device 110. As an example, the application may inform the user that a flashing blue light on the smoking substitute device 110 indicates that a consumable 150 (e.g. a pod) is empty.

It is noted that the application may inform the user about any number of functions of the smoking substitute device 110.

The application may communicate with the application server 4 via network 8, and receive information from the application server about the function(s).

At S104, the application instructs the smoking substitute device 110 to demonstrate the function(s) wirelessly via a wireless interface on the mobile device 2 and wireless interface 134 on the smoking substitute device 110. The instructions may be based on the information received from the application server 4.

At S105, the smoking substitute device 110 demonstrates the function(s). According to the above example, the smoking substitute device 110 may first demonstrate a flashing red light, indicating low battery, and then demonstrate a flashing blue light, indicating that a consumable 150 is empty.

The demonstration of the function(s) (i.e. the feedback) does not necessarily require the function(s) to be performed. As an example, demonstrating a flashing red light usually indicative of low battery may not necessarily require the smoking substitute device 110 to have a low battery at the time of the demonstration. Instead, the application instructs the smoking substitute device to simulate the flashing red light indicating low battery by providing feedback in the form of a flashing red light. The user is therefore aware that a flashing red light usually indicates a low battery, without the smoking substitute device 110 having a low battery at the time of the demonstration.

The application may be further configured to inform the user that the function(s) is being demonstrated. As an example, when the smoking substitute device demonstrates a red flashing light function (i.e. at S105), the application may inform the user that the smoking substitute device 110 is demonstrating the red flashing light function. Similarly, when the smoking substitute device demonstrates a blue flashing light function (i.e. at S105), the application may inform the user that the smoking substitute device 110 is demonstrating the blue flashing light function.

Alternatively, the application may be configured to inform the user that the function will be demonstrated, or that the function has been previously demonstrated.

It is noted that the functions (i.e. feedback) of the smoking substitute device 110 are not limited to flashing red or blue lights, but may be any one or more of, but not limited to, operating a light, operating a light in a predetermined colour, operating a flashing light in a predetermined sequence and/or a predetermined colour, haptic feedback (e.g. vibration of the smoking substitute device), producing a sound.

Example states of the smoking substitute device 110 indicated by the feedback include (i) the smoking substitute device 110 is charging; (ii) the power source 128 of the smoking substitute device has low battery; (iii) the power source 128 of the smoking substitute device has full battery; (iv) the smoking substitute device 110 is searching for a connection (e.g. a wireless connection) to the application on the mobile device 2; (v) the smoking substitute device 110 is connected to the application on the mobile device 2; (vi) the smoking substitute device 110 is not connected to the application on the mobile device 2; (vii) the smoking substitute device 110 is being activated; (viii) the smoking substitute device 110 is not being activated; (ix) a consumable 150 is not correctly connected to the main body 120 of the smoking substitute device 110; (x) a consumable is correctly connected to a main body 120 of the smoking substitute device 110; (xi) a consumable 150 is empty; (xii) a consumable 150 is full.

Figure 5:
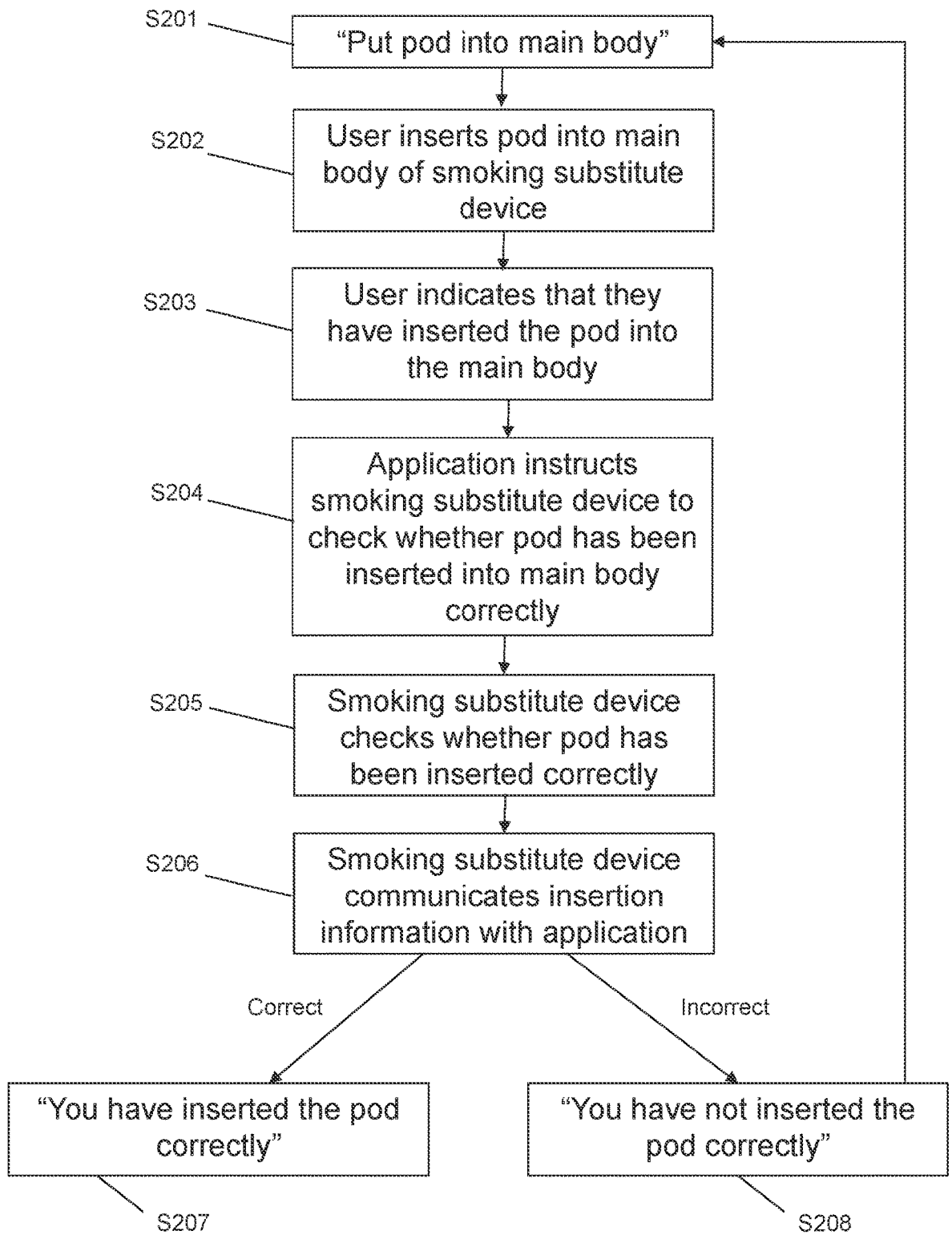
FIG. 5 is a block diagram showing another example method involving the smoking substitute device of FIG. 2(a).

FIG. 5 shows another example method involving the smoking substitute device 110 of FIG. 2(a). This method allows a user to learn how to operate the smoking substitute device 10 to perform an operation, without needing to read a paper-based instruction manual. More specifically, FIG. 5 shows a method for ensuring that a consumable 150 (referred to here as a "pod") is correctly inserted into the main body 120 of the smoking substitute device 110. It is noted that a similar method to that shown in FIG. 5 may be used to ensure that another operation is performed correctly.

At S201, the application asks the user to position a consumable 150 ("pod") into a top end 122 of the main body 120. As an example, the application may display a message stating "Put pod into main body."

At S202, the user inserts the pod 150 into the main body 120 of the smoking substitute device 110. At S203, the user indicates at the application that they have inserted the pod 150 into the main body 120.

At S204, the application wirelessly instructs the smoking substitute device 110 to check (i.e. verify) whether the pod 150 has been correctly inserted into the main body 120. At S205, the smoking substitute device 110 checks whether the pod 150 has been correctly inserted into the main body 120. The smoking substitute device 110 may measure a value indicative of the electric power between the electrical interface 136 of the main body 120, and the electrical interface 160 of the pod 150 in order to verify that the pod 150 is correctly inserted into the main body 120 of the smoking substitute device 110.

At S206, the smoking substitute device S206 wirelessly communicates information (i.e. "insertion information") about whether the pod 150 is correctly inserted into the main body 120 of the smoking substitute device 110, to the application. The application then informs the user whether the pod 150 is correctly inserted into the main body 120 of the smoking substitute device 110 based on the insertion information. If the pod 150 is correctly inserted, the application displays a message stating that the pod is correctly inserted (e.g. at S207). If the pod is incorrectly inserted, the application displays a message stating that the pod is incorrectly inserted (e.g. at S208). If the pod is incorrectly inserted, the application may then repeat S201-S206 until the pod 150 is correctly inserted into the main body 120 of the smoking substitute device 110.

Of course, a skilled reader would readily appreciate that the smoking substitute device 110 shown in FIGS. 2(a), 2(b), and 2(c) and FIGS. 3(a) and 3(b) shows just one example implementation of a smoking substitute device, and that other forms of smoking substitute device could be used as the smoking substitute device 10 of FIG. 1.

By way of example, a HNB smoking substitute device including a main body and a consumable could be used as the smoking substitute device 10 of FIG. 1, instead of the smoking substitute device 110. One such HNB smoking substitute device is the IQOS™ smoking substitute device discussed above.

As another example, an open system vaping device which includes a main body, a refillable tank, and a mouthpiece could be used as the smoking substitute device 10 of FIG. 1, instead of the smoking substitute device 110. One such open system vaping device is the blu PRO™ e-cigarette discussed above.

As another example, an entirely disposable (one use) smoking substitute device could be used as the smoking substitute device 10 of FIG. 1, instead of the smoking substitute device 110.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the present disclosure in diverse forms thereof.

While the present disclosure has been described in conjunction with the exemplary embodiments described above, many equivalent modifications and variations will be apparent to those skilled in the art when given this disclosure. Accordingly, the exemplary embodiments of the present disclosure set forth above are considered to be illustrative and not limiting. Various changes to the described embodiments may be made without departing from the spirit and scope of the present disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A system for managing an electronic smoking substitute device, the system comprising:
  a mobile device; and
  an electronic smoking substitute device;
  wherein the mobile device comprises:
    an application installed thereon, the application configured to
    communicate with the electronic smoking substitute device, wherein the application is configured to;
      instruct a user to perform an operation at the electronic smoking substitute device, wherein the operation is inserting an electronic consumable into a main body of the electronic smoking substitute device;
      verify whether the operation has been correctly performed by the user at the electronic smoking substitute device; and,
      inform the user whether the operation has been correctly performed;
  wherein the electronic smoking substitute device is configured to communicate with the application, and
  wherein the electronic smoking substitute device is configured to inform the user whether the operation has been correctly performed by the user at the electronic smoking substitute device by providing feedback to the user, the feedback provided to the user by the electronic smoking substitute device includes one or more actions selected from the list of actions performed by the electronic smoking substitute device consisting of: operating a light, operating a light in a predetermined color; operating a flashing light in a predetermined sequence; operating a flashing light in a predetermined color, providing haptic feedback, and producing a sound.

2. The system of claim 1, wherein the electronic consumable is incorrectly inserted and the application is further configured to inform the user the electronic consumable is inserted incorrectly until the electronic consumable is inserted correctly.

3. The system of claim 1, wherein verifying whether the operation has been correctly performed by the user at the electronic smoking substitute device includes the application communicating with the electronic smoking substitute device to instruct the electronic smoking substitute device to determine whether the operation has been correctly performed by the user at the electronic smoking substitute device.

4. The system of claim 1, wherein the application informs the user whether the operation has been correctly performed by displaying a notification on a screen of the mobile device.

5. The system of claim 1, wherein the electronic smoking substitute device communicates information to the application indicating whether the operation has been performed correctly, and the application informs the user whether the operation has been performed correctly based on the information received from the electronic smoking substitute device.

6. A method of using a mobile device on which an application is installed, wherein the application is configured to communicate with an electronic smoking substitute device, the method comprising the steps of:
  instructing, by the application, a user to perform an operation at the electronic smoking substitute device, wherein the operation is inserting an electronic consumable into a main body of the electronic smoking substitute device;
  verifying, by the application, whether the operation has been correctly performed by the user at the electronic smoking substitute device; and
  informing the user whether the operation has been correctly performed;
  communicating, by the electronic smoking substitute device, with the application; and
  providing feedback, by the electronic smoking substitute device, to the user, the feedback indicating whether the operation has been correctly performed by the user at the electronic smoking substitute device, the feedback provided to the user by the electronic smoking substitute device includes one or more actions selected from the list of actions performed by the electronic smoking substitute device consisting of: operating a light, operating a light in a predetermined color; operating a flashing light in a predetermined sequence; operating a flashing light in a predetermined color, providing haptic feedback, and producing a sound.

7. A non-transitory computer-readable medium having computer-executable instructions configured to cause a mobile device to perform the method according to claim 6.

* * * * *